United States Patent

Thietje

[15] 3,643,867
[45] Feb. 22, 1972

[54] SELF-PROPELLED IRRIGATION SYSTEM

[72] Inventor: Rudolph N. Thietje, 1744 S. Dayton Pl., Kennewick, Wash. 99336

[22] Filed: Nov. 14, 1969

[21] Appl. No.: 876,903

[52] U.S. Cl.................................239/183, 239/184, 239/272, 137/580
[51] Int. Cl..........................................B05b 3/18
[58] Field of Search................239/183, 184, 185, 271, 272, 239/547, 576; 137/344, 580

[56] References Cited

UNITED STATES PATENTS 3,012,574  12/1961  Baker et al..............................137/580
3,349,794  10/1967  Behlen..............................239/183 X Primary Examiner—M. Henson Wood, Jr.
Assistant Examiner—Michael Y. Mar
Attorney—Clarence A. O'Brien and Harvey B. Jacobson

[57] ABSTRACT

A supply conduit is positioned across a field to be irrigated. The conduit has a slit formed along its length and a displaceable seal is located in sealing relation with the slit. A water commutator rides along the conduit and has riders connected thereto which depress that portion of the seal upon which the commutator is riding thereby allowing waterflow from the conduit to the commutator. Sprinkler supply pipes communicating with the commutator mount means for driving the sprinkler supply pipe and the commutator along the length of the supply conduit. The drive means comprises wheels powered by pressured water in the sprinkler supply pipes.

11 Claims, 14 Drawing Figures

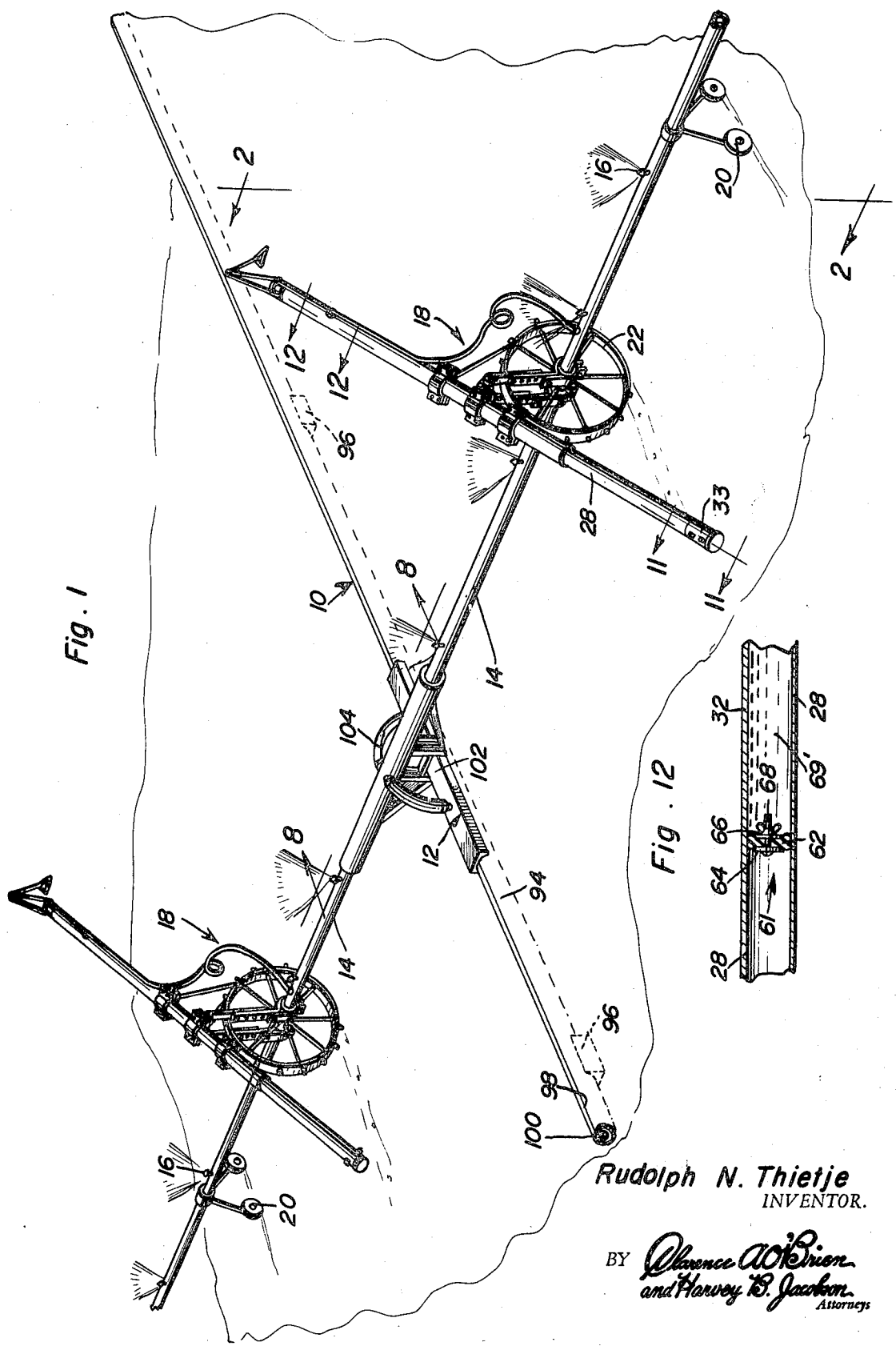

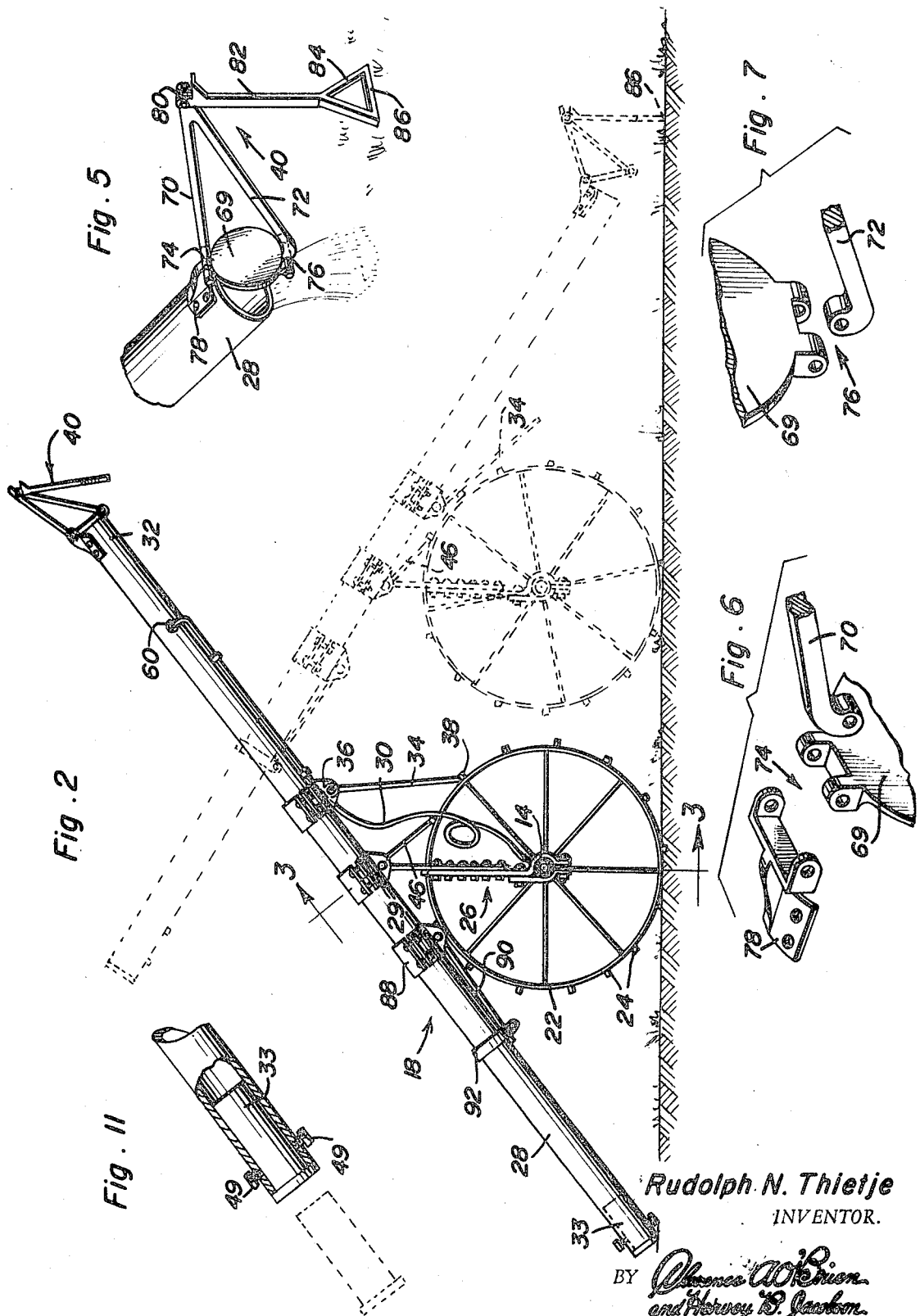

Rudolph N. Thietje
INVENTOR.

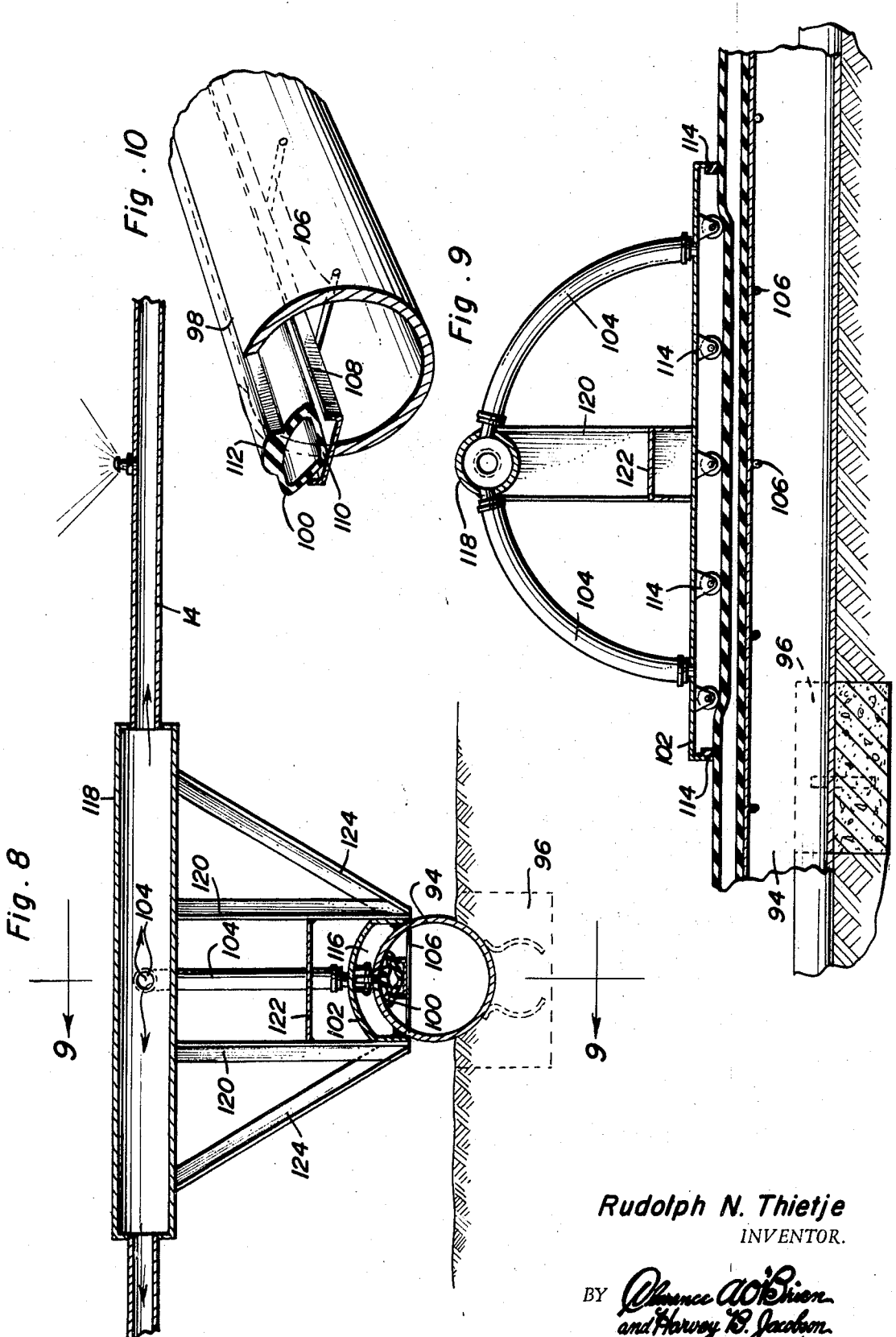

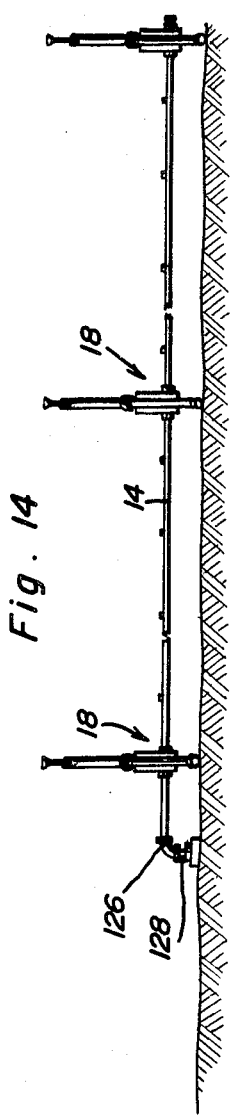
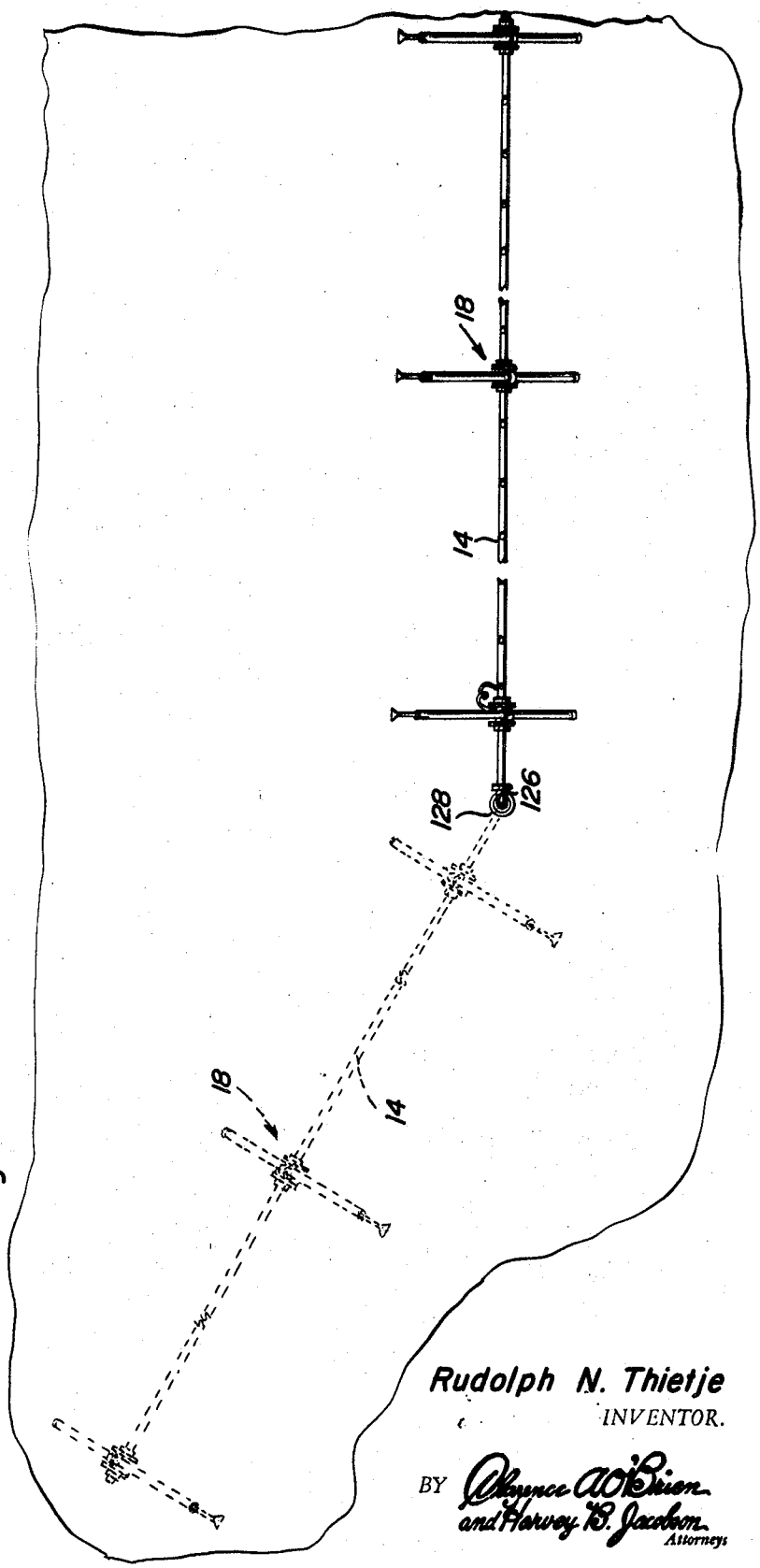

SELF-PROPELLED IRRIGATION SYSTEM

The present invention relates to self-propelled irrigation systems.

The prior art is replete with irrigation systems utilizing a main supply conduit communicating with branch pipes that are propelled by mechanically or electrically powered driving means. However, it has been found that these systems require a large financial outlay due to the number of components which power the driving means connected to the branch pipes. In addition, these components are prone to deterioration due to their exposure to the elements of weather. As a result, equipment failure occurs all too frequently resulting in shutdown. Also, due to the extensive utilization of electrical components in prior art devices, the reliability of the system is decreased thereby necessitating rather frequent maintenance and replacement of parts.

The present invention is directed to a completely mechanical irrigation system which is self-propelled by utilizing pressured water supplied to the driving means. The simple mechanical operation of the present invention results in a greater financial realization due to reduced maintenance and replacement costs. Also, the present invention requires a smaller financial investment than comparable irrigation systems available.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the composite operative components of the present invention in an environmental setting.

FIG. 2 is a side elevational view of the driving means utilized in the present invention.

FIG. 5 is a partial perspective view illustrating the camming action which causes release of accumulated water in the lever means of the present invention.

FIG. 6 is a partial perspective view showing a hinge for connecting a closure to the end of the lever as shown in FIG. 5.

FIG. 7 is a second hinge joint connected to the closure that is depicted in FIG. 5.

FIG. 8 is a vertical sectional view illustrating the disposition of a water commutator on a supply conduit.

FIG. 9 is a vertical sectional view taken along a plane passing through section line 9—9 of FIG. 8.

FIG. 10 is a partial sectional view showing the disposition of a seal in the supply conduit.

FIG. 11 is a partial cutaway view disclosing a removable counterweight which is positioned on a lower end of the lever in the present invention.

FIG. 12 is a partial sectional view illustrating a seal for forming a bulkhead in the lever of the driving means.

FIG. 13 is a modification to the invention for use in irrigating a circular area.

FIG. 14 is an elevational view illustrating the sprinkler supply pipe connected to a pivotal union.

Figure 4:
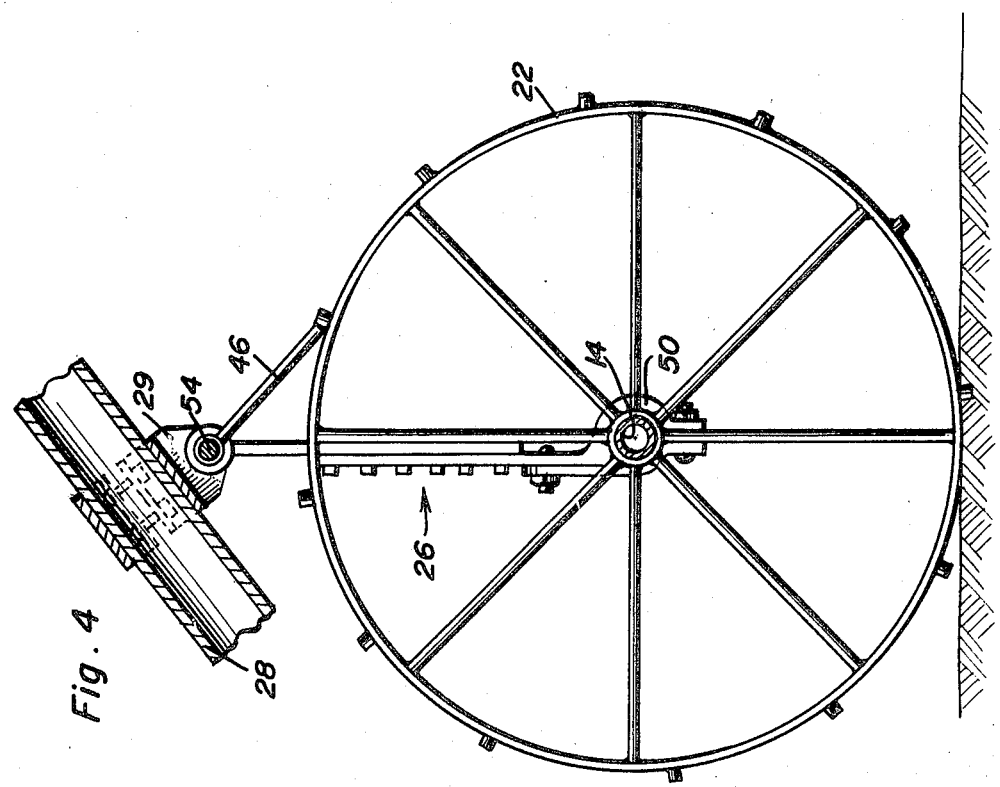
FIG. 4 is a side elevational view of a pawl and ratchet mechanism connected between the wheel and the lever of the means for driving a sprinkler pipe in the present invention.

FIG. 1 illustrates a self-propelled irrigation system which is capable of irrigating a rectangular field area. Fluid is supplied from a central source through a supply conduit 10 lying along a stretch of field. A water commutator 12 communicates with a transversely mounted sprinkler supply pipe 14 and forms a section of the path along which water flows from the supply conduit. As will be noted, conventional irrigation nozzles 16 are connected to the sprinkler supply pipe 14. A plurality of drive means 18 are rotatably mounted to the sprinkler supply pipe 14 and as will be explained hereinafter, a portion of the water delivered to the sprinkler supply pipe 14 is utilized by the drive means for propelling the sprinkler supply pipe and the connected water commutator 12 along the supply conduit 10. In order to stabilize the sprinkler pipe 14, rollers 20 are connected along spaced points on the sprinkler supply pipe 14.

Referring to FIG. 2, the components of the driving means 18 include a spoked wheel 22 having radially extending cleats 24 positioned at spaced intervals along the outward periphery of the wheel. These cleats mounted on the wheel serve as a ratchet as will be explained hereinafter. A vertically upstanding support 26 adjustably mounts a tubular lever 28 at a fulcrum point 29, the latter forming part of a split collar positioned at a median point along the length of the lever 28. The wheel 22 is rotatably mounted on the sprinkler supply pipe 14 and a tube 30 provides a communication path between the sprinkler supply pipe 14 and an upper hollow end portion 32 of the lever 28. Thus, during operation of the device, water is caused to flow from the sprinkler supply pipe 14 into the end portion 32 which accumulates water until a predetermined quantity is accumulated. This quantity causes pivotal displacement of the lever 28 from the upwardly inclined position illustrated to a downwardly inclined position shown in phantom. A counterweight 33 is located in the opposite end portion of the lever tube 28 to normally urge the lever into the upwardly inclined position illustrated in solid lines.

A second split collar 36 secures a pivot pin for a rod 34 which extends downwardly to engage the cleats 24 of wheel 22. In the position shown in FIG. 2, rod 34 engages cleat 38 thereby effecting pawl and ratchet engagement. During operation of the device, as water is fed from the sprinkler supply pipe 14 to the upper end portion 32 of pipe 28 via tube 30, the upper end of the lever becomes more heavily weighted than the lower counterweighted end. This uneven weight distribution causes clockwise rotation of the lever and urges rod 34 downwardly against cleat 38 thereby providing motive force to wheel 22. The wheel rotates until the final downward position of the lever 28 is reached as illustrated in phantom whereupon the rod 34 has finally slipped over the engaged cleat 38 thereby freeing further pawl and ratchet engagement. A closure generally indicated by reference numeral 40 normally seals the upper end portion of lever 28 until camming means connected to the closure engage the ground surface resulting in the opening of the closure and release of the accumulated water. Under such circumstances, the counterweighted end of the lever is once again more heavily weighted thereby causing the lever 28 to return to its initial position shown in FIG. 2, during which time the rod 34 skips over the underlying cleats. As the system operates, the periodic oscillation of the lever about the wheel 22 causes incremental rotation of the wheel along the ground surface resulting in propulsion of the connected sprinkler supply pipe 14 and connected water commutator 12 (FIG. 1). Referring to FIGS. 2 and 4, a second rod 46 mounted to the pivot point of split collar 29 will be seen to engage a cleat upwardly adjacent from the aforementioned cleat 38 in the manner of a pawl and ratchet. The purpose of this engagement between rod 46 and an associated cleat is to prevent backsliding of the driving means 18 when the latter traverses an upwardly inclined ground surface.

Figure 3:
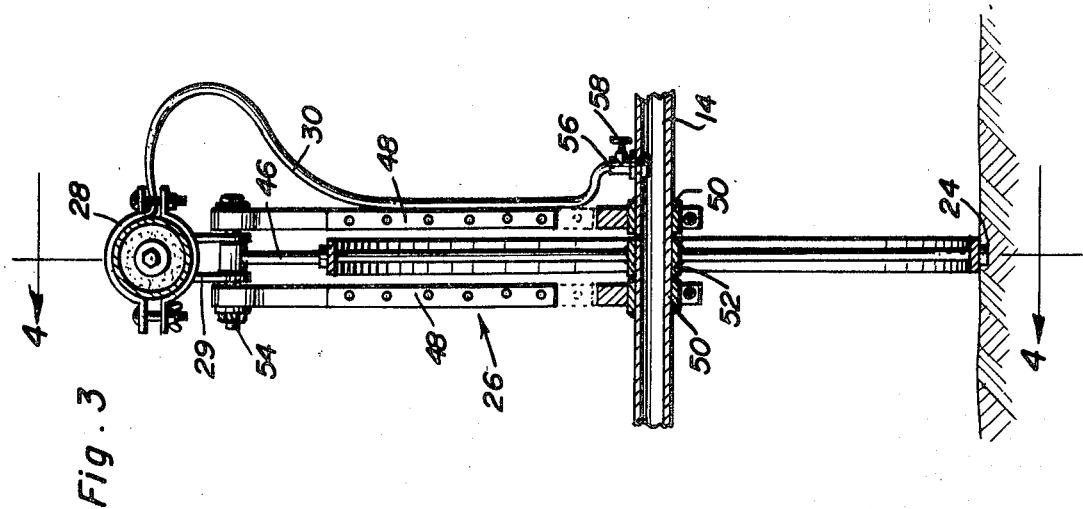
FIG. 3 is a sectional view of the driving means illustrated in FIG. 2.

Considering the wheel section of the driving means 18 in further detail, reference is made to FIG. 3 wherein two parallel spaced upstanding braces 48 are disposed in radial adjacent relation to both sides of the upper half of wheel 22. The lower ends of the braces 48 terminate in boss elements 50 which concentrically engage the sprinkler supply pipe 14 and are suitably fixed thereto so that the braces 48 and the supply pipe 14 do not move relative to each other. A hub 52 disposed in the central portion of wheel 22 is rotationally mounted on the supply pipe 14 and is free to rotate thereon. Thus, the braces 48 and pipe 14 remain stationary with respect to one another while the wheel 22 rotates with respect to the supply pipe 14. The upper ends of braces 48 form a clevis through which a pivot pin 54 passes and serves to pivotally mount the tubular lever 28 via ears appending from split collar 29 which rotate with respect to the pivot pin 54. A fluid fitting 56 is mounted in the sprinkler supply pipe 14 and is connected to the lower end of connecting tube 30. The fitting 56 includes a valve 58 therein to control the rate of flow through the fitting.

Referring to FIG. 2, an inlet fitting 60 in the upper end portion 32 of the lever accepts the upper end of conducting tube 30. Thus, a metered path of communication between the hollowed upper end portion 32 of lever 28 and the sprinkler supply pipe 14 is effected.

The interior of the upper end lever section 32 is seen in greater detail in FIG. 12. The lever 28 is an elongated hollowed tube having a removable bulkhead 61 disposed in the upper end. This bulkhead includes an O-ring 62 centrally mounting washers 64 and 66 on opposite sides thereof. A bolt 68 having a wing nut passes through the washers 64 and 66 so that upon fastening of the wing nut, the O-ring expands outwardly to form a seal and define a water accumulating chamber 69' in the upper end portion of the lever.

As previously mentioned, a closure normally seals the outward end of the lever as generally indicated by reference numeral 40. The component parts of the closure are illustrated in FIG. 5 and these components are seen to include a disclike cover 69 which is hingedly connected to the outward end of the tubular lever 28. Camming means is connected to the cover 69 and causes the normally closing cover to open when the lower end of the lever approaches the ground. The camming means includes acutely angled arms 70 and 72 connected at their outward ends in hinges 74 and 76, respectively. As will be seen in FIG. 6, the hinge 74 has a clevis member integrally attached to a mounting bracket 78 which in turn is connected to the outward end of the lever 28. A similar clevis is connected to the periphery of the cover 69 and slips into the aforementioned clevis in bracket 78 thereby permitting the passage of the lower end of arm 70 in the clevis of cover 69 whereby a hinge pin passing through the clevis members and the arm 70 forms the hinge joint 74. FIG. 7 illustrates the additional hinge connection of arm 72 to include a clevis element integrally connected to cover 69 and adapted to engage the lower end of arm 72 wherein a hinge pin passing through the clevis and the arm end completes the hinge joint 76. Referring back to FIG. 5, the apex of arms 70 and 72 is indicated by 80 and is pivotally connected to a bar member 82 extending outwardly to a triangular shaped element 84 which is adapted to engage a ground surface upon the lowering of the lever 28 as indicated by 86. As will be noted from FIGS. 2 and 5, when the triangular element 84 engages the ground, camming action is translated to the cover 69 resulting in the opening thereof and the freeing of water that has accumulated in the chamber of the upper lever end portion to be followed by return of the lever to its original position.

As pictured in FIG. 2, the driving means will cause displacement of wheel 22 from the left to the right direction. Thus, in operation of the device when a field has been traversed and it is desired to reverse the direction of system movement, the cam assembly 40 and the bulkhead 61 (FIG. 12) can be removed. Also, the counterweight 32 at the lower end of the lever 28 is removed and these components are switched to opposite lever ends so that reversal of the end components in the lever 28 is effected. This component reversal will result in weight shifting so that the right end of the lever 28 as shown in FIG. 2 will normally assume a lower position with respect to the left end. Now, as the driving means operates, the wheel will be driven from the right to the left forcing reversal of system traversal across a field. As will be appreciated, it will be necessary for a new pawl orientation to come into being. The rod 34 is removed from engagement with the cleats 24 on the wheel 22 and instead, a second rod 90 pivotally connected to a split collar 88 is freed from engagement with a retaining ring 92 disposed along the length of lever 28. The ring 92 is removed from the ring and placed in proximity with the split collar 36 thereby allowing the retention of the previous pawl rod 34 in a position where it will not interfere with reversed operation.

Referring to FIG. 1, the specific structure of the main supply conduit 10 is seen to include an elongated pipe 94 having a slit 98 extending along the length thereof. The conduit 94 is positioned in anchoring ground blocks 96 at regularly spaced intervals along the conduit. An elongated elastomeric seal 100 is disposed in the slot and normally forms a liquid seal for the main supply conduit 10. The water commutator 12 includes an inverted trough-shaped member 102 which is adapted to ride along the length of conduit 94. As the trough-shaped member rides along the conduit, the portion of seal 100 which underlies the member is depressed thereby allowing the passage of water from the main supply conduit 10 into the trough shaped member 102. Annular pipe sections 104 are connected between the trough-shaped member 102 and the sprinkler supply pipe 14 to permit communication between the main supply conduit 10 and the sprinkler supply pipe 14.

Referring to FIG. 10, the exact relationship between the supply conduit 10 and the seal 100 is clearly illustrated. As will be noted, transversely positioned rods 106 are attached at opposite ends thereof to the interior wall surface of conduit 10. A channel member 108 is positioned atop the rods 106 and serves as a support for the elongated seal 100. The cross section of the seal includes a central hollow portion and a generally oblong surrounding wall 110. The lower edge of the wall 110 contacts the channel 108 and the upper edge 112 of the seal is enlarged and protrudes upwardly to abut against the confronting edges of the elongated slit 98. Thus, as will be observed from the figure, the upper portion of the seal 112 normally seals the slit 98 and upon the exertion of downward pressure on the upper seal edge, the seal is compressed downwardly to clear the slit 98. The means for depressing the seal is illustrated in FIG. 9 to include a plurality of longitudinally aligned rollers 114 which ride along supply conduit 10 and displace the seal downwardly so that the confronting edges of the slit 98 form a track for the rollers.

By studying FIG. 8 it will be appreciated that once the seal is depressed downwardly, water can flow from the interior of the supply conduit 94 and pass seal 100 for delivery into the chamber defined by the inverted trough shaped member 102. Pipe sections 104 connect the trough member 102 to the sprinkler supply pipe 14. More particularly, the outlet ends of pipe sections 104 terminate in an enlarged tubular section 118 which steps down to the sprinkler supply pipe 14. In order to retain the sprinkler supply pipe in an elevated fixed position above the ground, a frame is connected between the inverted channel member 102 and the tubular section 118. The frame includes two vertically disposed braces 120 connected between the tubular section and the channel member. A horizontal web 122 retains the braces 120 in place. Angular braces 124 extend from the lower ends of the vertical braces 120 for connection to the tubular section 118.

Thus far, the apparatus described is particularly suited for self-propelling motion along a linear path so that irrigation of a rectangular area can be effected. However, the driving means 18 of the present invention can be employed in a radially disposed sprinkler supply pipe so that circular irrigation can be realized. The mechanics for effecting this type of irrigation is illustrated in FIGS. 13 and 14. As will be noted from these figures the conduit system is greatly simplified when irrigation of a circular area is desired. Thus, a plurality of driving means 18 as hereinbefore described propel a sprinkler supply pipe 14. The radially inward end of the pipe is connected to an elbow fitting 126 and the inlet port of the elbow is connected to a water source through a rotatably mounted pipe section 128. Thus, as the driving means 18 operate, the radial arm defined by sprinkler supply pipe 14 circumscribes a circle during which time the area inside the circle becomes irrigated.

In summary, the basic operation of the present device will be explained with reference to FIG. 1. A chamber in the upper end portion of lever tube 28 accumulates water derived from the sprinkler supply pipe 14. After a predetermined weight of water is accumulated in the chamber, the counterweight at the opposite end of the lever is defeated and the upper lever end pivots downwardly. As this pivoting motion takes place, a pawl connected to the lever engages a cleat on the wheel 22 of the driving means and exerts a driving force thereon. As the upper end of the lever approaches the ground, a camming assembly on the upper end forces a closure on the end to open thereby releasing the accumulated water. After release of this water, the counterweight at the opposite lever end controls and causes the lever to assume the original position. The pawl skips over the ratchet cleats on the wheel during the return of the lever to the original position so that only unidirectional displacement of the driving means occurs. As sequential cycles of this lever displacement take place, the sprinkler supply pipe 14 is moved along the main supply conduit 10 and all during this time, the nozzles positioned along the sprinkler supply pipe 14 irrigate the traversed ground. The water commutator 12 displaces a seal positioned in the main supply conduit 10 as it passes over a particular seal portion and causes the clearing of the seal from the supply conduit. This clearance permits passage of water from the supply conduit to the sprinkler supply pipe 14.

In operation of the present invention for circular irrigation, the commutator and elongated supply conduit are eliminated as seen in FIGS. 13 and 14. Instead, the driving means 18 propel a radially extending sprinkler supply pipe 14 which is pivoted at a radially inward point thereof to a water supply source.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid distribution system comprising a main fluid supply conduit, an opening formed along the length of the conduit, displaceable seal means located in the opening for normally retaining the conduit in a fluid sealing condition, a fluid commutator adapted to ride on the conduit and exert displacement forces against the seal means along the portion of the conduit contacted by the commutator for enabling discharge of fluid from the conduit and through the displaced seal means for passage to the commutator, and ports formed in the commutator adapted for communication with auxiliary fluid distribution apparatus, the conduit being an elongated pipe having the opening therein formed as an axially spaced slit, and support means connected to the pipe for supporting the displaceable seal means in the slit.

2. A fluid distribution system comprising a main fluid supply conduit, an opening formed along the length of the conduit, displaceable seal means located in the opening for normally retaining the conduit in a fluid-sealing condition, a fluid commutator adapted to ride on the conduit and exert displacement forces against the seal means along the portion of the conduit contacted by the commutator for enabling discharge of fluid from the conduit and through the displaced seal means for passage to the commutator, and ports formed in the commutator adapted for communication with auxiliary fluid distribution apparatus, the commutator comprising a receptacle carrier adapted to ride along the conduit, seal means connected around the carrier to prevent leakage therefrom, mobilizing support means connected to the carrier and extending in a manner enabling displacing contact with the displaceable seal means resulting in the carrier becoming filled with fluid, and means communicating with the carrier for passing the carrier contained fluid to the port, the mobilizing means comprising at least one roller connected to an upper carrier wall, the displaceable seal means being disposed in spaced opposition to the wall whereby the roller moves along the seal means and exerts the supported weight of the commutator on the contacted portion of the seal means.

3. A fluid distribution system comprising a main fluid supply conduit, an opening formed along the length of the conduit, displaceable seal means located in the opening for normally retaining the conduit in a fluid-sealing condition, a fluid commutator adapted to ride on the conduit and exert displacement forces against the seal means along the portion of the conduit contacted by the commutator for enabling discharge of fluid from the conduit and through the displaced seal means for passage to the commutator, and ports formed in the commutator adapted for communication with auxiliary fluid distribution apparatus, a sprinkler supply conduit connected to the commutator port for exercising united movement with the commutator, sprinkler means connected to the sprinkler supply conduit for generating an irrigation spray, driving means for driving the commutator and sprinkler supply conduit along the main fluid supply conduit, the driving means being connected to the sprinkler supply conduit and powered by consumption of a portion of the fluid flowing through the sprinkler supply conduit, the driving means comprising a wheel rotatably mounted to the sprinkler supply conduit, fulcrum means being attached to the sprinkler supply conduit, and lever means pivotally mounted to the fulcrum means, the lever means including a chamber therein communicating with the sprinkler supply conduit for accumulating a portion of the fluid flowing through the conduit, counterweight means connected to the lever means for normally positioning the lever means in a first inclined position, the lever being displaced to assume a second inclined position after a predetermined accumulation of weight-shifting fluid, pawl and ratchet means connected between the lever means and the wheel for causing movement of the wheel in response to lever means displacement, closure means normally sealing the chamber during accumulation of fluid therein, and camming means connected to the closure means for causing opening of the closure means when the camming means engages a surrounding surface during displacement of the lever means to the second position, said opening causing release of the accumulated fluid and predominance of the counterweight for returning the lever means to the first position.

4. In a mobile fluid distribution system having a fluid conduit, the driving mechanism comprising a wheel rotatably mounted to a liquid supply conduit, fulcrum means being connected to the liquid conduit, and lever means pivotally mounted to the fulcrum means, the lever means including a chamber therein communicating with the conduit for accumulating a portion of the fluid flowing through the conduit, counterweight means connected to the lever means for normally positioning the lever means in a first inclined position, the lever means being displaced to assume a second inclined position after a predetermined accumulation of weight shifting fluid, pawl and ratchet means connected between the lever means and the wheel for causing movement of the wheel in a single direction in response to lever means displacement, closure means normally sealing the chamber during accumulation of fluid therein, and camming means connected to the closure means for causing opening of the closure when the camming means engages a surrounding surface during displacement of the lever means to the second position, said opening causing release of the accumulated fluid and defeat of the counterweight for returning the lever means to the first position.

5. The structure set forth in claim 4 wherein the counterweight and the chamber are selectively reversible, and second pawl means for operating with the ratchet means during component reversal thereby allowing travel of the wheel in an opposite direction.

6. In a mobile fluid distribution system having a fluid supply conduit, a driving mechanism comprising a rotatably mounted drive wheel for moving the distribution system, an elongated fluid container having a sealed end and an open end and being pivotally mounted intermediate said ends for rotation from a filling position to an emptying position, said sealed end being above said open end when said container is in the emptying position, such that the fluid will flow from the container through said open end, and motion transfer means connected with said fluid container for rotating said drive wheel in response to rotation of said container from said filling position to said emptying position.

7. The structure set forth in claim 6 wherein said motion transfer means includes a pawl and ratchet means for rotating said drive wheel and permitting said container to return to said filling position after the fluid is expelled therefrom while in said emptying position.

8. The structure set forth in claim 7 wherein said container normally assumes said filling position when empty, such that it automatically rotates back to the filling position after the fluid is emptied therefrom in said emptying position.

9. The combination set forth in claim 8 together with closure means for temporarily sealing said open end of said container when said container is in said filling position.

10. The combination set forth in claim 9 together with camming means connected to said closure means for opening said closure means when said camming means engages a surrounding surface as said container approaches said emptying position.

11. The combination set forth in claim 6 together with fluid conduit means associated with said distribution system for sequentially filling said container after each emptying thereof.

* * * * *